(12) United States Patent
Horacek (10) Patent No.: US 6,974,626 B2
(45) Date of Patent: Dec. 13, 2005

(54) SHOCK AND VIBRATION DAMPENING GRIP

(76) Inventor: Patricia Horacek, P.O. Box 22652, Carmel, CA (US) 93922

( * ) Notice: Subject to any disclaimer, the term of this patent is extended or adjusted under 35 U.S.C. 154(b) by 221 days.

(21) Appl. No.: 10/431,697

(22) Filed: May 8, 2003

(65) Prior Publication Data

US 2004/0224151 A1    Nov. 11, 2004

(51) Int. Cl.[7] .......................... A63B 49/08; B32B 7/12
(52) U.S. Cl. ...................... 428/354; 428/343; 473/300; 473/302; 473/303; 16/110.1; 16/430; 16/431; 16/421
(58) Field of Search .................. 428/343, 354; 473/300, 302, 303; 16/110.1, 430, 431, 421

(56) References Cited

U.S. PATENT DOCUMENTS

| | | | | |
|---|---|---|---|---|
| 4,979,743 A | * | 12/1990 | Sears | 473/204 |
| 4,981,737 A | * | 1/1991 | Rico | 428/41.7 |
| 5,261,665 A | * | 11/1993 | Downey | 473/303 |
| 5,397,123 A | * | 3/1995 | Huang | 473/550 |
| 6,006,403 A | * | 12/1999 | Battiato | 16/421 |
| 6,662,406 B2 | * | 12/2003 | Shonfeld et al. | 16/431 |
| 2004/0121850 A1 | * | 6/2004 | Rohrer | 473/300 |
| 2004/0224151 A1 | * | 11/2004 | Horacek | 428/354 |

* cited by examiner

Primary Examiner—Daniel Zirker
(74) Attorney, Agent, or Firm—Jeffrey A. Hall (57) ABSTRACT

A shock and vibration dampening grip wrap comprised of at least two layers of elastomeric material having differing densities. When applied to a handle the grip wrap provides a firm and reversible grip, and is water-resistant. The shock and vibration dampening wrap includes an upper, denser grip elastomer layer overlaying a second, less dense base elastomer layer. These layers may be optionally conjoined by an elastomer adhesive, a built-up structure, or formed as a unitary structure without recourse to this elastomer adhesive. A grip wrap adhesive and primer are applied to an underside of the base elastomer to affix the grip wrap to the desired handle. An extrusion methodology for forming the grip elastomer layer further serves to create within the grip elastomer an open-celled structure having exceptional wicking characteristics. This structure, in combination with an optional surface texture applied to an upper surface of the grip elastomer provides both shock and vibration dampening, as well as a water-resistant surface.

14 Claims, 5 Drawing Sheets

Fig. 11

SHOCK AND VIBRATION DAMPENING GRIP

BACKGROUND OF THE INVENTION

1. Field of Invention

This invention relates to grip materials for dampening vibrations and shocks transmitted through handles, and more particularly to a grip wrap material and method of applying the grip wrap material for dampening such shocks and vibrations.

2. Description of the Related Art

Heretofore a wide variety of shock and vibration dampening material and methods have been proposed and developed for dampening vibrations and shocks in handles. There are many human endeavors where a user or operator must firmly grip or hold an instrument or handle which is subject to transient mechanical vibration and shock. Such shocks may be individual, for instance when a tennis player strikes a tennis ball with a racquet, or repetitive. Repetitive shocks may further be classified as cyclic or acyclic. An example of a cyclic shock might be the shock felt by the operator of a pneumatic jackhammer. An acyclic shock may be exemplified by the shocks felt by a carpenter using a conventional hammer. While the succeeding discussion of shock-absorbing grips is focused on the sport of tennis, those having ordinary skill in the art will appreciate that the features and advantages of the present invention disclosed herein are applicable to a wide variety of gripping problems, such as baseball bats, golf clubs, hockey sticks, bicycle handlebars, and the like. Accordingly, the invention disclosed herein should be construed to include all forms of human endeavor wherein it is desirable to maintain a positive grip between an operator and handle while minimizing the impact force felt by the user through the handle.

Tennis is a well known sport which has been shown to subject players thereof to a wide variety of shock-related traumas. These include, but are not limited to: tennis elbow, more accurately elbow crunch; shoulder crunch; and wrist crunch. Each of these traumas is initiated and exacerbated by the shock or impact force caused by the impact of the tennis ball on the tennis racquet.

Elbow crunch is the excess centripetal force acting at the elbow, an excess that occurs because on impact the racquet slows down, so its centrifugal force drops. The centripetal force of the muscles attaching to the elbow and the centrifugal force of the racquet in its swing may balanced before the impact, but sudden slowdown creates what is effectively a muscle spasm. The muscle continues to contract as if it still had a full load, so it suddenly shortens and yanks on the tendons that attach to the elbow. Elbow crunch is a cyclic stress which, repeated over time, may be a contributing cause to tissue failure.

Shoulder crunch is the change in the centrifugal force acting on the racquet, a change that occurs due to impact slowing the racquet down, thus creating a sudden excess in centripetal force at the shoulder. Before, the centripetal force and centrifugal force were in equilibrium, but suddenly there is an excess centripetal force. This is effectively a muscle spasm in the shoulder muscles.

Wrist crunch is derived in the same manner as elbow crunch, only the distance is measured from the mass center to the wrist, not the elbow. This distance is equal to the distance from the wrist to the racquet's axis of rotation plus the distance from the axis of rotation to the balance point.

Impact force is the change in the racquet's momentum on impact, divided by the time it occurs. It is the force, or shock measured in Newtons, appearing at the mass center or balance point upon impact with the ball. For low resultant stresses on the arm, this impact should be low.

In order to minimize impact force, much effort has been expended by manufactures of tennis racquets and accessories. Tennis grips tend to present the designer thereof with several challenges. First, the grip must be sufficiently firm in the players hand such that he or she may deliver an accurate shot across the net to his or her opponent. The grip must, of necessity, take at least two forms. A first grip commonly utilized by tennis players is the so-called "Eastern" grip utilized by forehand shots. A second grip commonly utilized by tennis players is the so called "western" grip utilized for backhand shots. Of course, other grips may be used as well. It will be appreciated that during the course of the game, the player must rapidly and accurately shift from one grip to another, without reference to visually checking his or her grip. This necessitates a second desirable feature of tennis grips wraps; while they must provide a firm and accurate gripping surface for the player, they must also be capable of rapid and accurate realignment to an alternate grip. This characteristic is sometimes referred to as a grip wrap's "spinnability".

A tennis player often generates considerable perspiration during the course of a match. Perspiration on the player's hands has generally been detrimental to maintaining a good grip with the racquet. This fact gives rise to a third desirable feature of tennis grips, which prior to the making of the present invention had yet to be adequately fulfilled; namely that the grip should minimize or be unaffected by the presence of perspiration on a player's hands during play.

Figure 1:
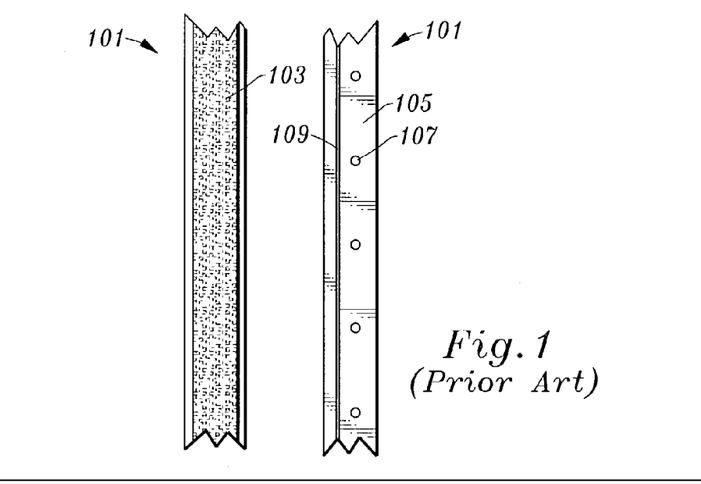
FIG. 1, is a plan view of a length of a prior art grip wrap.

To accomplish such features, manufactures have typically produced grip wrap materials which are applied, for instance by helically winding, about the bare handle of a tennis racquet. With reference to FIG. 1, these grip wraps, 101, typically take the form of an elongate composite formed of thin layer of a soft material 103, for instance felt, which is applied to one side of a waterproof tape 105, in this example a vinyl tape. This vinyl tape 105, with its underlying felt cushioning 103, is wrapped helically about the handle of the tennis racquet, not shown. Variations of this basic technology include defining one or more perforations, 107, along and through the length of vinyl tape 105, whereby the underlying felt cushioning is further used to absorb perspiration from the user's hands. One example of this technology may be found in U.S. Pat. No. 5,397,123 to Huang. Another variation includes mechanically texturing the surface of the vinyl tape or including the length of cord, 109, between the felt 103 and the vinyl 105, either of which is designed to improve the user's grip.

There are several problems with this methodology. A first, and most important problem is that the shock absorption or dampening of these grips is limited. During the development of the present invention a number of shock absorption tests were undertaken on both a grip constructed according to the principles hereinafter enumerated, and a number of existing tennis grip wraps which purport to be "shock-absorbing". Graphs of three of these current tennis grip graphs are shown as prior art FIGS. 2–4. The test methodology employed for each grip is identical. A weight was dropped a distance of 1.5 inches onto a sample grip wrap and the resultant acceleration was plotted over time.

Figure 2:
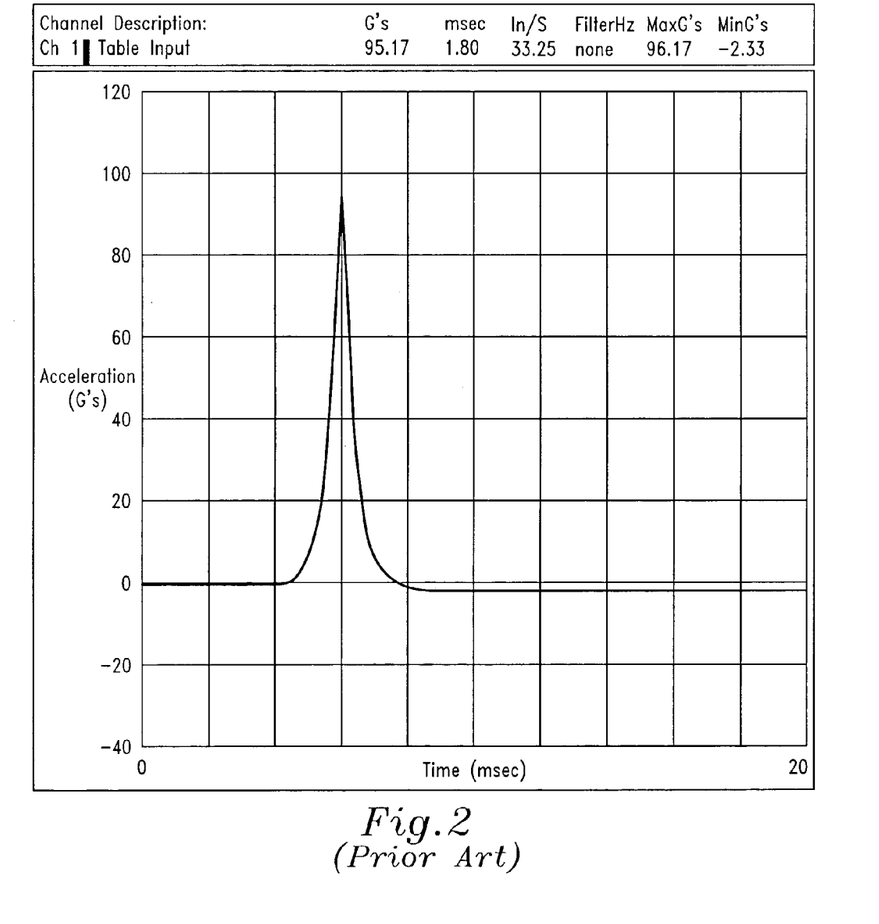
FIG. 2, is a graph of peak acceleration over time for a prior art tennis racquet grip dampened according to a first prior art grip wrap.

In the first test, shown in FIG. 2, a currently available commercial grip wrap hereinafter identified as "Y" was examined. The results of this test showed that for the standard weight, the perceived impact force measured as acceleration is 96.17 G, which impact force occurred over the time span of 1.80 milliseconds.

Figure 3:
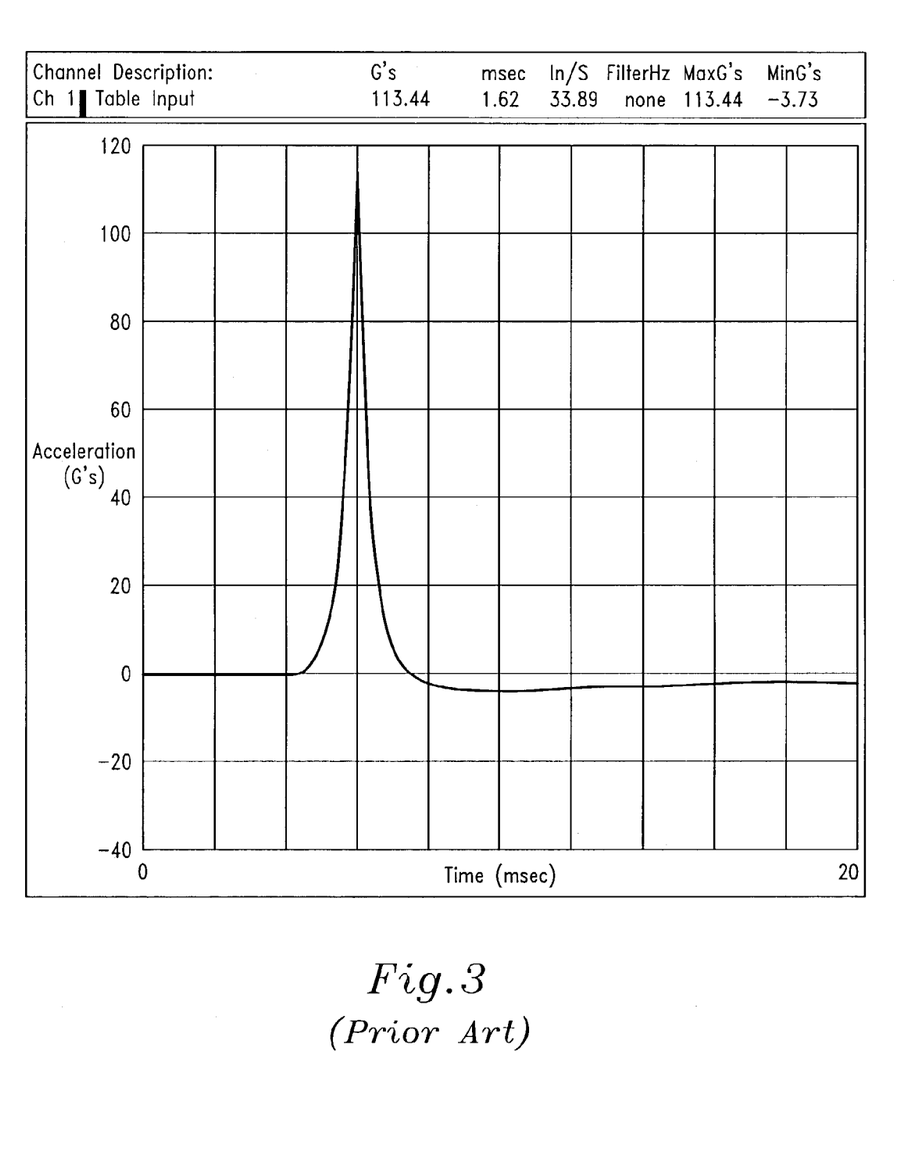
FIG. 3, is a graph of peak acceleration over time for a prior art tennis racquet grip dampened according to a second prior art grip wrap.

In the second test, shown in FIG. 3, a second currently available commercial grip hereinafter identified as "D" was examined. The results of this test showed that for the standard weight, the perceived impact force measured as acceleration is 113.44 G, which impact force occurred over a time span of 1.62 milliseconds.

Figure 4:
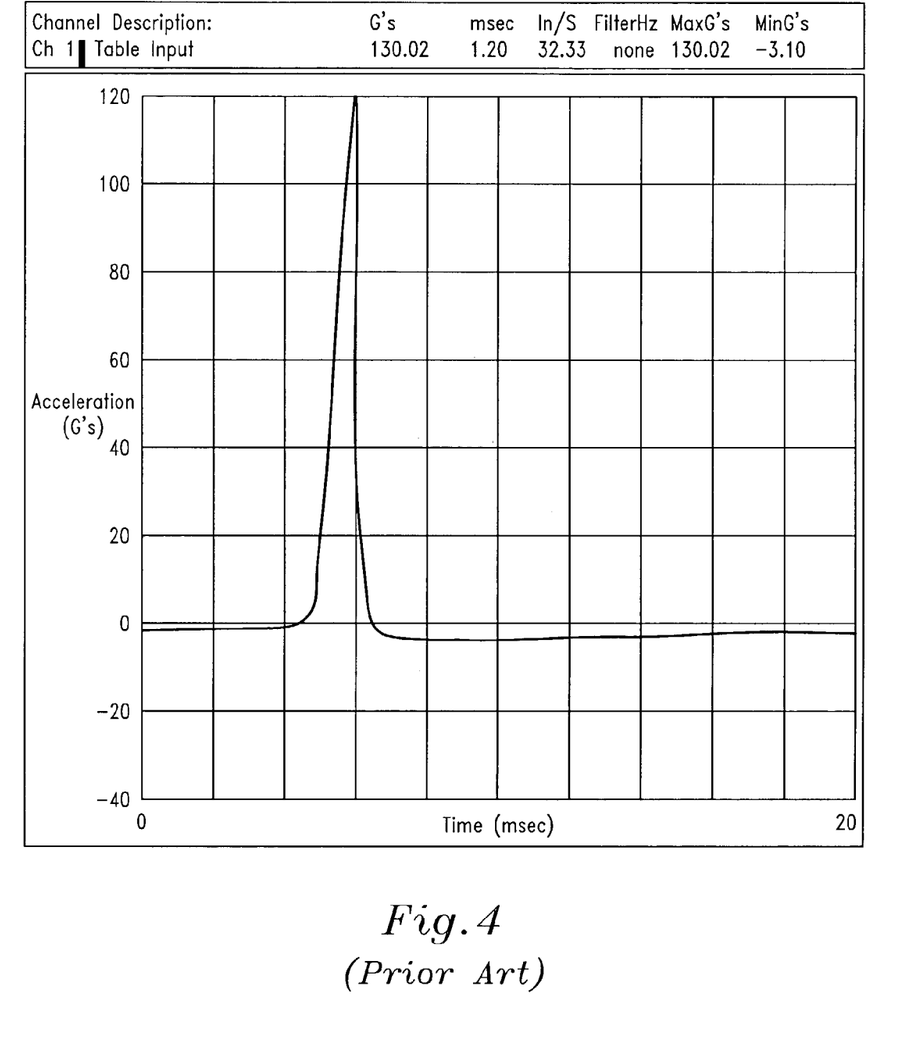
FIG. 4, is a graph of peak acceleration over time for a prior art tennis racquet grip dampened according to a third prior art grip wrap.

In the third test, shown in FIG. 4, a third currently available commercial grip wrap hereinafter identified as "Y" was examined. The results of this test showed that for the standard weight, the perceived impact force measured as acceleration is 130.02 G, which impact force occurred over the time span of 1.20 milliseconds.

In order to improve on this shock absorption, two things must occur in order to minimize perceived impact shock. The overall acceleration must be lowered, and concomitantly the duration of the perceived impact shock should be increased.

What is needed therefor is device and method which will substantially decrease the perceived impact force felt by the user gripping a handle which is subject to impact forces. In order to accomplish this desirable result, the peak acceleration perceived by the user should be decrease. In order to effect this decrease, it is generally beneficial to increase the duration of the perceived impact force.

The invention provides such a grip, as well as one which is a secure grip despite widely varying conditions of ambient humidity, for instance the moisture or humidity formed by perspiration.

The present invention also provides such aforementioned secure grip, which enables the user to quickly shift grip without excessive "tackiness" of the grip, which would impair the spinnability thereof.

BRIEF SUMMARY OF THE INVENTION

The present invention provides a unique shock-dampening grip comprised of at least two layers of elastomeric material having differing densities. The grip, when applied to a handle, provides not only a firm and reversible grip, but is also water-resistant in a unique fashion. The shock absorbing grip wrap of the present invention preferably includes an upper, more massive and denser outer or grip elastomer layer overlaying a second, less massive and less dense inner or base elastomer layer. However, in different embodiments, this configuration may be reversed. These layers may be optionally conjoined by an elastomer adhesive as a built-up structure, or formed as a unitary structure without recourse to this elastomer adhesive. A primer is preferably applied to the elastomer surface, and the use of vibration adhesives aid the dampening effect.

The layers are optionally formed as an elongate grip wrap, having something of the appearance of a length of tape. Once formed and wound, for instance helically, about a handle, the grip wrap of the present invention forms a substantially whole or entire outer grip formed or a relatively dense, massive elastomer overlaying a more compliant core formed of a less dense, less massive elastomer. In one embodiment, the outer layer is formed of an elastomer whose density is somewhat reduced by foaming, which process gives the outer grip elastomer a unique water wicking capability which results in a superb gripping surface. A grip wrap adhesive is preferably applied to an underside of the base elastomer to affix the grip wrap to the desired handle.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

Reference numbers refer to the same or equivalent parts of the invention throughout the several figures of the drawings.

DETAILED DESCRIPTION OF THE INVENTION

Reference will now be made in detail to the present preferred embodiments of the invention as illustrated in the accompanying drawings.

Figures 5, 6, 7, 8, 9:
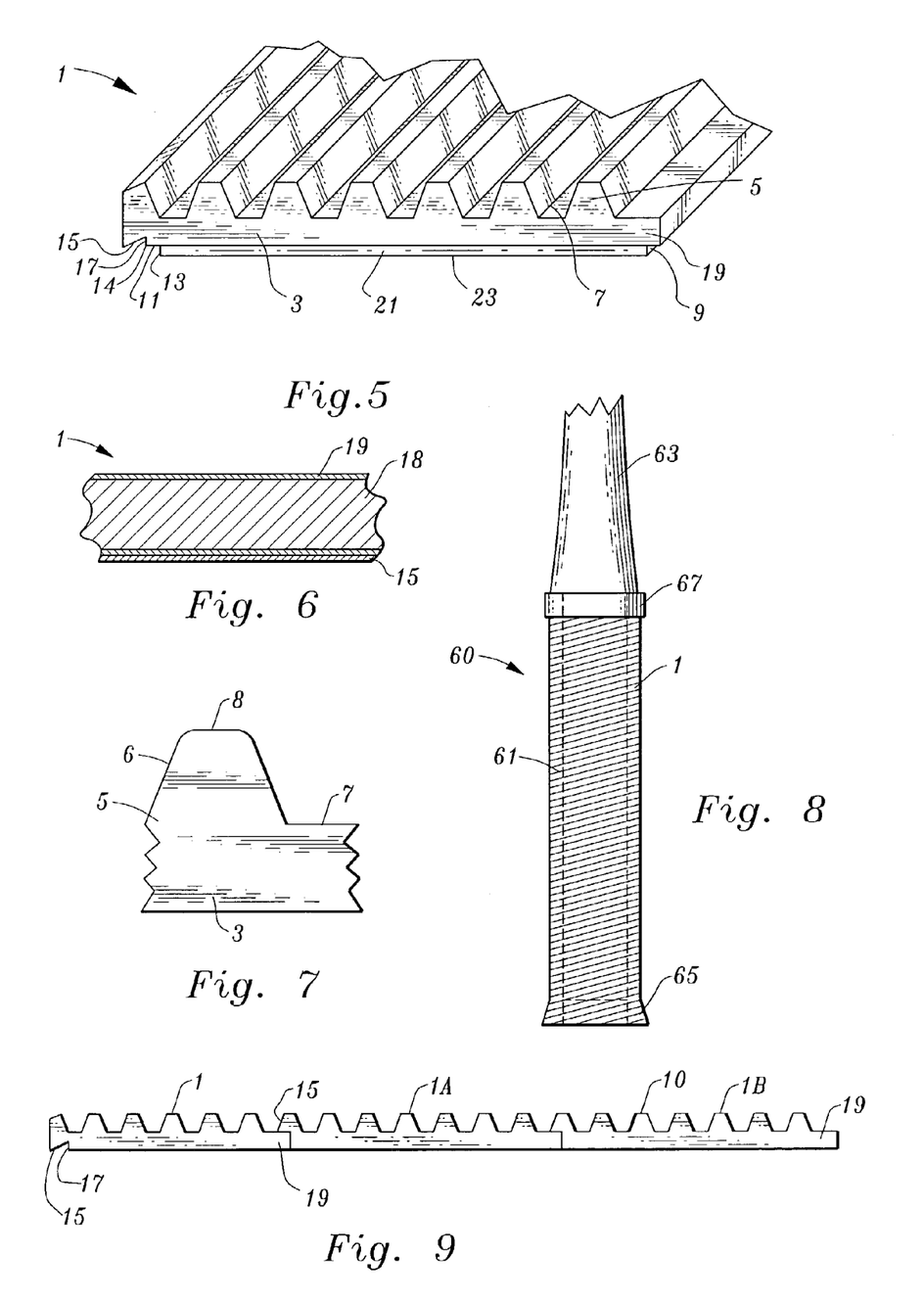
FIG. 5, is a perspective view of a length of grip wrap tape according to one embodiment of the present invention, including a cross-section therethrough, the grip being optimized for use on a tennis racquet.
FIG. 6, is a plan view of the under side of a length of grip wrap tape according to one embodiment of the present invention.
FIG. 7, is a detail of a rib profile formed on a grip wrap according to one embodiment of the present invention.
FIG. 8, is a plan view of a tennis racquet handle wrapped with a length of grip wrap tape according to one embodiment of the present inventions.
FIG. 9, is a cross-section through overlapping segments of grip wrap tape according to one embodiment of the present invention.

With reference to FIGS. 5 and 6 a first preferred embodiment of the present invention is disclosed. This embodiment of the present invention comprises a length of shock-dampening grip wrap 1. Preferably, grip wrap 1 comprises, in operative combination, a length of relatively massive and dense grip elastomer 3, having applied to an underside 11 thereof a corresponding length of relatively less massive and less dens base elastomer 9. The less massive and dense base elastomer 9, is preferably applied to the massive and dense grip elastomer 3, with a vibration dampening adhesive. The vibration dampening adhesive is preferably applied on an under surface 23, of base elastomer 9, to facilitate attachment of grip wrap 1 to the handle, not shown in this figure, to which grip wrap 1, is applied.

It should be noted that there exists a large number of chemically distinct elastomer families, each family having many specific elastomer compounds. Accordingly, as used herein, the term "elastomer" is accorded it widest interpretation consistent with normal usage, i.e.:". . . an elastic substance . . .", and includes but is not specifically limited to plastics, thermoplastics, thermosets, natural and synthetic rubbers, neoprene, urethanes, butyl rubbers, silicone rubbers, and the like as well as combinations and mixtures of the foregoing capable of being formed into the one and the relatively denser and more massive outer grip and the relatively less dense and less massive base.

In testing during the development of grip wrap 1, including a combination of elastomers having different densities, showed a first surprising result of the combination: the shock dampening provided by the combination of elastomers is greater than the sum of the separate shock dampening provided by the two separate elastomers adhered together with the vibration adhesive. While not wishing to be bound by theory, it is believed that a considerable amount of additional dampening occurs at the interface between the relatively denser outer, or grip elastomer 3, and the relatively less dense inner, or base elastomer 9.

Preferably, base elastomer 9 may be advantageously formed in operative combination with grip elastomer 3, using either built-up or unitary construction methodologies. Examples of the former include any of several flexible attachment methodologies well known to those having ordinary skill in the art, including but not limited to vibration dampening adhesives such as adhesives, glue, pressure sensitive adhesive, adhesive tape, melt-bonding, adhesive fiber tape, or thermal bonding, thermosonic welding, and the like. A priming step utilizing a primer may be incorporated if desired. Exemplar unitary construction methodologies include casting, sintering, and co-extrusion, and so forth. It will be appreciated that the foregoing construction examples are by way of illustration and not limitation, and substantially any methodology for flexibly attaching one elastomeric layer to another which is known to those having ordinary skill in the art may, with equal facility, be implemented in forming the grip wrap of the present invention. All such attachment methodologies are specifically contemplated by the principles enumerated herein.

The elastomers may be sized by cutting, slicing, sawing extrusion, casting, sliting, pressing, rolling, and other forming technologies well known in the art.

During development of the present invention, a second unexpected result eventuated from studies relating to attaching grip elastomer 3 to base elastomer 9. For a given grip elastomer/base elastomer pair, the selection of the adhesive utilized to join the elastomer layers used to form a grip wrap affected the resultant shock and vibration dampening qualities of the grip wrap. The grip wrap of the present invention forms a substantially whole or entire outer grip formed of a relatively dense, massive elastomer overlaying a more compliant core formed of a less dense, less massive elastomer to a marked extent. However, it is possible, to reverse the densities of the elastomeric layer. An observation of the unique properties of the present invention presents as much as 10% of the overall shock and vibration dampening effect results from the preferred configuration of elastomers. Again, while not wishing to be bound by theory, it is surmised that either the mass of the adhesive, or some other inherent property thereof synergistically adds to the dampening of the entire grip wrap. This phenomenon is decidedly product-specific, and moreover, it is observed to be interdependent on the elastomer pair used to form the grip wrap. In order to optimize shock and vibration absorption for a given application, the best adhesive is empirically selected.

A grip wrap adhesive, preferably a vibration dampening adhesive, is preferably applied to an underside 23 of base elastomer 9 to facilitate attachment of grip wrap 1 to a handle, not shown in the drawings. A similar synergistice phenomenon positively affecting the shock dampening qualities of grip wrap 1 was observed with the selection of grip wrap adhesive 13. While this second adhesive phenomenon was less pronounced that the elastomer adhesive phenomenon previously discussed, the proper selection of an adhesive for a given elastomer pair was also shown to positively affect shock dampening.

The shock and vibration absorbing grip wrap 1 of the present invention includes an upper, relatively more massive and denser grip elastomer layer 3 overlaying a second, less massive and less dense base elastomer layer 9. However, as noted above, this density configuration may be reversed in alternative embodiments. These layers may be optionally conjoined by and elastomer adhesive, preferably a vibration dampening adhesive, as a built-up structure, or formed as a unitary structure without recourse to this elastomer adhesive. A grip wrap adhesive 13 is preferably applied to an underside 11 of the base elastomer to affix grip wrap 1 to the desired handle, not shown in the figure. The entire structure may be formed as a length of grip wrap tape for winding, for instance helically, about a handle. This then forms a substantially whole of entire outer grip formed of a relatively dense, massive elastomer overlaying a more compliant core formed of a less dense, less massive elastomer.

The shock and vibration absorbing wrap of the present invention may be used in a wide variety of applications, for example, tennis racquets, baseball bats, golf clubs, hockey sticks, bicycle handlebars, and other situations where shock and vibration dampening are desired. By adjusting the masses, densities, and dimensions of base elastomer 9 and grip 3, as well as making the proper selections of grip adhesive 13, and elastomer adhesive 21 where utilized, a grip wrap may be optimized for a wide variety of applications. These applications comprehend differences in size and mass of the instrument whose handle is being wrapped, the mass and strength of the individual using the instrument, the nature of the shock, whether it be individual, cyclic or acyclic, and the mass of the item to which the instrument is applied.

Elastomer density may be tailored according to any of several methodologies well known in the art. These include the simple selection of elastomers having different densities as supplied, and the adjustment of those densities, for instance by foaming or expansion of the elastomer. Elastomers may be "gas-blown" using nitrogen or other gasses to create closed-cell structures. Alternatively, they may be "chemically blown" by the addition of a quantity of a chemical foaming agent, of CFA, to the elastomer during the formation thereof. The latter foaming methodology often results in a cell structure which is at least partially open.

Grip elastomer 3 may be formed having an upper surface configured in substantially any manner which will impart the requisite gripping characteristics to the grip. By way of illustration, but not limitation, these upper surface configurations include, but are specifically not limited to, smooth, knurled, sanded, ribbed, impressed, indented, raised features, and other surface topologies well known in the art. In the preferred embodiment illustrated in FIGS. 5, and 7–9, grip wrap 1 is formed having at least one and preferably a plurality of parallel longitudinal ribs, 5. In one embodiment, the formation of a plurality of ribs 5 results in the formation of a corresponding plurality of grooves, 7.

In one preferred embodiment shown in FIG. 5, grip elastomer 3 is formed of Santoprene (registered trademark) rubber 101-64, available from Advanced Elastomer Systems L.P., Akron, Ohio, hereinafter, "Santoprene". Santoprene is a proprietary mixture of natural and synthetic elastomers and has a specific gravity of 0.97 (ASTM D 792), and a 5 second Shore A hardness of 64 (ASTM D 2240). Other physical properties of this material may be found on product data information available from Advanced Elastomer Systems. The grip elastomer of this embodiment was formed by means of extrusion, more fully discussed below. Prior to extrusion, grip elastomer 3 had admixed therewith sufficient quantity of chemical foaming agent, or CFA, to reduce the specific density of the grip elastomer by a factor of 50 percent, or about 0.5 SG. In this embodiment of the present invention, Hydroceral (registered trademark)B1H-40E, was utilized as a CFA to perform the requisite density reduction. This addition provided an unexpected advantage, discussed below. Hydroceral B1H-40E is available from Clariant Additive Masterbatches, Masterbatch Division, Winchester, Va.

Alternative materials and densities from about 0.15 SG to about 8.0 SG, more specifically from about 0.25 SG to about 2.0 SG, more particularly still from about 0.35 SG to about 1.0 SG and most particularly about 0.5 SG may, with equal facility be implemented to form the grip elastomer, based on the desired degree of shock dampening and the material and density selected for the base elastomer.

According to one embodiment of the present invention, grip elastomer 3 is preferably extruded, using a single screw thermoplastics extruder with a L/D ratio of at least 24:1. Longer L/D rations were shown to have wider processing windows the extruder's extrusion screw provided a compression ration of from 2.5 to 3.1. CFA loadings of from 2–12% resulted in the previously discussed degree of foaming. The exact degree of CFA loading required for a given product is highly application specific, and depends on many factors including process temperatures, elastomer selected, and degree of density reduction desired, among others. CFA may be admixed with the raw elastomer pellets in any of several methodologies well known in the art. For smaller batches, raw elastomer pellets are fed into the extruder's feed hopper along with the correct among of CFA. For larger batches requiring continuous flow processing, CFA can be metered into the extruder's feed throat using a separate, metered feeder. Moreover, some elastomer suppliers are now pre-mixing CFA with the raw elastomer to achieve a desired degree of foaming thereof. Any of these may be advantageously utilized to form either of the elastomer layers of the present invention. The use of Maddox mixers, barrier sections, or mixing pins will provide improved dispersion of the CFA.

In order to provide a substantially seamless wrap appearance when applied to a handle, one embodiment of the present invention contemplates the implementation of a receiver 17, on one side of the length of grip elastomer 3, and a corresponding lip, 19 on an opposite side of grip elastomer 3. In this embodiment of the present invention, receiver 17 comprises a longitudinally formed groove defined by the shoulder 14 of a receiver step, 15.

With reference to FIG. 5, receiver step 15 is preferably formed at an angle with respect to an underside of grip elastomer 3. According to one embodiment of the present invention the acute angle subtended is 20 degrees, although other acute angles from zero to ninety degrees, may with equal facility be implemented if required by the specific application. Shoulder 14 is formed substantially perpendicular to this same underside of grip elastomer 3.

Preferably attached to an underside 11 of grip elastomer 3 is a corresponding length of base elastomer, 9. According to one embodiment of the present invention low-density cellular urethane foam is utilized as base elastomer 9. One such foam particularly suitable for this application is Puron-60 (registered trademark) available from Rogers Corporation, High Performance Elastomers Division, Woodstock, Conn. Puron-60 is available in a number of densities as manufactured from about 0.15 SG to about 0.0.25 SG. The Puron-60 selected for use with the preferred embodiment presented herein has a relative density of 0.25 SG. Alternative materials and densities from about 0.10 SG to about 1.0 SG, more specifically from about 0.15 SG to about 0.0.75 SG, more particularly still from about 0.2 SG to about 0.4 SG and most particularly from about 0.25 SG may, with equal facility be implemented, based on the desired degree of shock and vibration dampening and the material and density selected for the grip elastomer. Base elastomer 9 may be foamed if desired.

Base elastomer 9 may be attached to an underside 11 of grip elastomer 3 by means of many different adhesive methodologies. According to one embodiment of the present invention a quantity of adhesive tape is used with a primer for elastomer adhesive 21 to permanently affix base elastomer 9 to grip elastomer 3. One elastomer adhesive tape which has been found particularly useful is NITTO 5015 double-sided tape, available from Permacel, New Brunswick, N.J. This adhesive tape not only provides for secure, permanent adhesion between base elastomer 3 and grip elastomer 9, but exhibits a significant degree of shock dampening augmentation, as previously discussed.

With continuing reference to FIGS. 5 and 6, a grip wrap 1 of the present invention is affixed to the bare handle of a tennis racket, or other handle, by means of a quantity of grip adhesive, 13. According to one embodiment of the present invention, one grip adhesive which has been shown to be particularly suitable is I-10213, available from Avery-Sennison Specialty Tape Division, Plainsville, Ohio. This tape is available with one or two release liners, 18, and either version may be utilized with equal facility. For reasons of economy, one embodiment of the present invention utilizes only one release liner and the grip adhesive 21, as supplied by the manufacturer, is rolled directly onto an under surface 23 of base elastomer 9. Where NITTO 5015 is idealized in one application as an elastomer adhesive, in that it forms a permanent bond, in contrast Avery-Dennison I-10213 is a less aggressive adhesive, and allows for some removal and repositioning during installation of the grip. Such adhesives function as a vibration dampening adhesive in the present application.

With reference now to FIG. 7, the configuration of one of ribs 5 found to be particularly suitable for use in tennis racquet applications is shown. According to this embodiment, rib 5 protrudes from groove 7 a distance of about 0.0054 inches. Rib wall 6, is formed at an angle with respect to groove 7. Substantially any acute angle may be subtended according to the application at hand, from about zero degrees for a substantially flat grip elastomer, to about 90 degrees, which would enable for substantially perpendicular ribs having substantially square sides. In one embodiment illustrated in FIG. 7, the angle is about 20 degrees. Optimized angles for rib 5 may be from about zero to 90 degrees with respect to the plane of grip elastomer 3, more particularly from about 15 degrees to about 75 degrees, and more particularly still from about 15 degrees to about 50 degrees.

Still more particularly, this angle may be from about 30 to about 50 degrees. For applications where grip spinnability is desired, the previously defined angle of around 15–25 degrees is advantageous, while about 20 degrees may be optimal in some applications. Where a firmer knurled grip is desired, an angle of from about 35 to about 60 degrees is preferred.

To provide the requisite degree of "spinnability" it has been found that the profile of rib wall 6 in combination with rib cap 8 may be important. Accordingly, a radius, for instance a 0.010 inch radius between rib wall 6 and rib cap 8 has been shown to provide at once the firm, secure grip required of tennis racquets while advantageously providing a particularly superior degree of spinnability. Other rib geometries including straight-shouldered, angled, rounded, arcuate, ogival and polygonal may, with equal facility be implemented.

In FIGS. 8 and 9, a length of grip wrap 1 applied to a racquet grip 61 of a tennis racquet 60 is shown. Grip wrap 1 is wound helically about racquet grip 61, preferably starting at butt 65, Wrapping continues towards the neck, 63, or racquet 60 overlapping receiver step 15 over at least a portion of lip 19. This overlapping which combines to form a substantially uniform wrap pattern is detailed in FIG. 9. With reference to FIG. 9, successive courses of a single, helically wound grip wrap 1 are shown as 1, 1A, and 1B. The advantages of forming receiver step 15 at the previously discussed angel now become apparent. By forming receiver step 15 at such an angle, its placement atop an adjacent lip 19 forces receiver step 15 upward into a substantially parallel alignment with an underside of grip elastomer 3. The low compression set afforded by the material which forms the grip elastomer ensures that it is retained elastically in intimate contact with lip 19.

Figure 10:
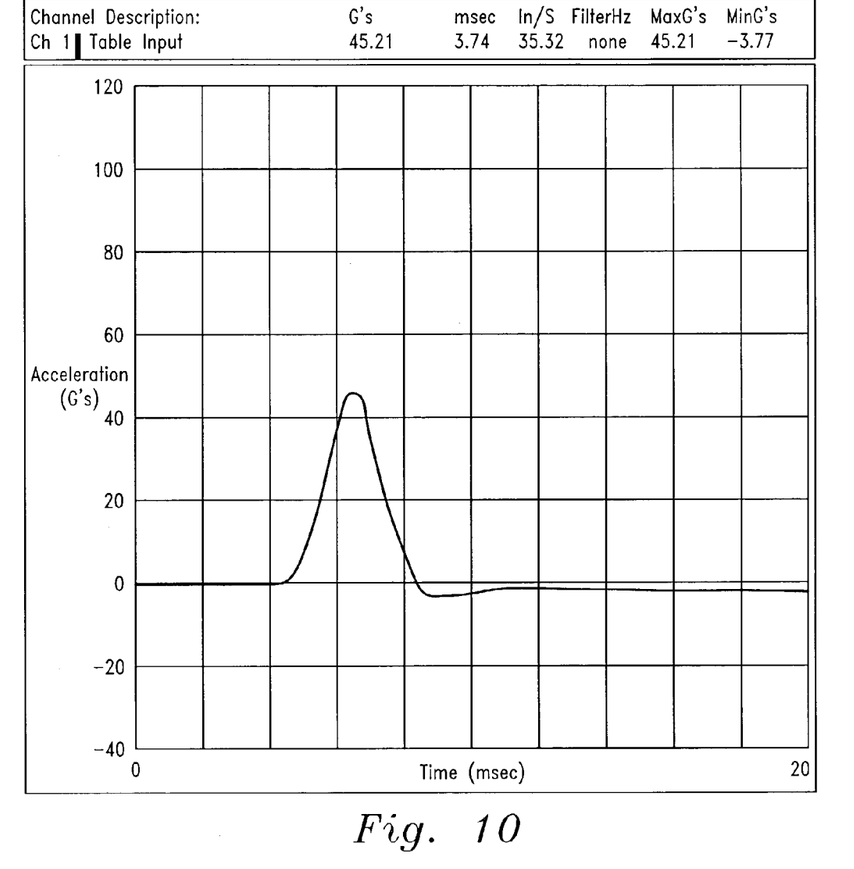
FIG. 10, is a graph of peak acceleration over time for a tennis racquet grip dampened according to one embodiment of the present invention.

The results of an impact test identical to those previously described for prior grip wraps was undertaken for a tennis racquet grip wrap constructed according to the principles of the present invention. Having reference now to FIG. 10, the rather startling results of that test are shown. Where the test applied to known prior art grip wraps always resulted in impact accelerations of form 96-130 G, the impact acceleration of a grip wrap constructed in accordance with the principles enumerated herein resulted in only 45.21 G. This is a reduction of perceived impact of at least 50 percent, and as much as 60 percent. Moreover, this perceived impact was spread out over a period of 3.74 msec. as opposed to the 1.2–1.8 msec. afforded by the prior art grip wraps. This combination of reduced impact acceleration over an increased time domain resulted in a grip which was at once extremely comfortable and very sensitive.

The addition of the previously discussed chemical foaming agent to grip elastomer 3 during the formation thereof, particularly by the extrusion thereof resulted in grip having hitherto unattainable levels of water resistance. During the extrusion process, the raw elastomer is heated to melt and forced through an extrusion die to form the requisite profile, for instance the profile of a tennis grip elastomer as shown in FIG. 5. The chemicals in the CFA react to a gas during heating, causing controlled foaming of the elastomer. This causes the formation of a cellular structure which is not necessarily uniform throughout the extrusion. Indeed, near the surface of the extrusion, where that extrusion flows along the heated extrusion die plate, there is formed a skin or "sheath" which can be formed such that while it is still cellular and thus water permeable, it is not as open a cellular structure as that portion of the extrusion immediately below it.

Many CFA's contain baking soda, NaHCO3, which is known to have drying properties under some circumstances. Extruding a grip elastomer 3 using a CFA containing NaHCO3, in combination with a plurality of fine ribs 5 formed on an upper surface of the grip elastomer exhibits a third surprising result. The cellular structure so formed, in operative combination with the airflow provided by the grooves between the ribs, results in a gripping surface which is dry and slip-resistant to an astonishing degree. During testing of the preferred embodiment previously discussed, water was flowed over the surface of the grip for several minutes. Immediately thereafter tennis play was resumed. The grip was, to all sensibilities, completely dry. The grip was firm, with no slipping observed whatsoever, and spinnability was quick and accurate to a degree heretofore unobtainable.

Figure 11:
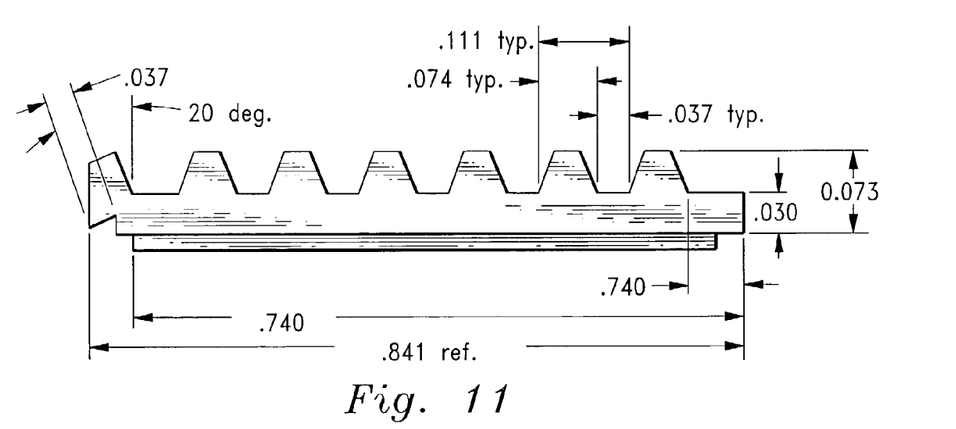
FIG. 11, is a cross-section through one grip wrap tape according to the present invention, illustrating one grip wrap geometry particularly suitable for use with tennis racquets, according to the invention.

Numerous surface profiles and topologies may, with facility, be implemented for different grip wrap applications, one surface wrap topology, defining a series of fine ribs and grooves and particularly suited to tennis racquet applications, is shown in FIG. 11.

As is evident from the above description, the shock and vibration dampening grip wrap of the present invention may be used in a wide variety of applications, not limited to sporting goods, and various configurations utilized for many different applications from the description given herein and additional advantages and modifications will readily occur to those skilled in the art. For example, aside from tennis racquets, the grip wrap may be used on other sporting goods such as baseball bats, golf clubs, hockey sticks, bicycle handlebars and the like. Other uses contemplated include, but are not limited to, tools, agricultural implements, pneumatically operated equipment, explosive operated equipment, powered equipment, firearms, cutting implements, surgical instruments, motor vehicles, air and water craft, and components thereof. The invention in its broader aspects is, therefore, not limited to the specific details, representative apparatus, methodologies, and illustrative examples shown and described. Accordingly, departures from such details may be made without departing from the spirit or scope of the applicant's general inventive concept

What is claimed is:

1. A shock and vibration dampening grip wrap for helically winding about, a handle, the shock and vibration dampening grip wrap comprising:
    an upper, relatively denser and more massive grip elastomer layer;
    a second, relatively less dense and less massive base elastomer layer disposed on a lower surface of the grip elastomer layer; and
    a grip wrap adhesive layer applied to an underside of the base elastomer, the grip wrap adhesive layer suitable for affixing the shock and vibration dampening grip wrap to the handle.

2. The shock and vibration dampening grip wrap of claim 1, wherein said grip elastomer layer and said base elastomer layer are formed as a unitary structure.

3. The shock and vibration dampening grip wrap of claim 1, wherein said grip elastomer layer and said base elastomer layer are formed as a laminated structure.

4. The shock and vibration dampening grip wrap of claim 1, wherein at least one of said grip elastomer layer and said base elastomer layer are selected from the group consisting of natural rubber, thermoplastic elastomer, thermoplastic urethane, synthetic rubber, neoprene, urethane, butyl rubber, silicone rubber, and combinations thereof.

5. The shock and vibration dampening grip wrap of claim 2, wherein the unitary structure is formed by a process selected from the group consisting of casting, sintering, and co-extrusion.

6. The shock and vibration dampening grip wrap of claim 3, wherein the laminated structure is formed by means of an adhesive interposed between said grip elastomer layer and said base elastomer layer.

7. The shock and vibration dampening grip wrap of claim 6, wherein said adhesive interposed between said grip elastomer layer and said base elastomer layer is selected from the group consisting of glue, pressure sensitive adhesive tape, and adhesive tape.

8. The shock and vibration dampening grip wrap of claim 3, wherein the laminated structure is formed by means of a bonding process performed between said grip elastomer layer and said base elastomer layer.

9. The shock and vibration dampening grip wrap of claim 8, wherein said bonding process is selected from the group consisting of melt-bonding, thermal bonding, and thermosonic welding.

10. The shock and vibration dampening grip wrap of claim 1, wherein the original density of at least one of said grip elastomer layer and said base elastomer layer is reduced to a second, lower density.

11. The shock and vibration dampening grip wrap of claim 10, wherein said original density of at least one of said grip elastomer layer and said base elastomer layer is reduced to a second, lower density by the addition of a chemical foaming agent.

12. The shock and vibration dampening grip wrap of claim 10, wherein at least one of said grip elastomer layer and said base elastomer layer is an extruded layer.

13. The shock and vibration dampening grip wrap of claim 10, wherein an upper surface of said grip elastomer layer is formed with at least one upper surface configuration selected from the group consisting of smooth, knurled, sanded, ribbed, impressed feature, indented feature, and raised feature.

14. A shock and vibration dampening grip wrap formed for helically winding about the handle of a tennis racquet, comprising:

an upper, relatively more massive and denser grip elastomer layer;

a lower, relatively less massive and less dense base elastomer layer formed of a closed-cell elastic material disposed on a lower surface of said grip elastomer layer;

binding means for binding said upper, relatively more massive and denser grip elastomer layer with said lower, relatively less massive and less dense base elastomer layer; and an upper surface of said grip elastomer layer defining a plurality of longitudinally disposed ventilation ribs.

* * * * *